United States Patent
Heinlein

(10) Patent No.: US 12,006,640 B2
(45) Date of Patent: Jun. 11, 2024

(54) TREATED WALNUT SHELL INFILL FOR ARTIFICIAL TURF

(71) Applicant: USGreentech, L.L.C., Cincinnati, OH (US)

(72) Inventor: Mark A Heinlein, Cincinnati, OH (US)

(73) Assignee: USGreentech, L.L.C., Cincinnati, OH (US)

( * ) Notice: Subject to any disclaimer, the term of this patent is extended or adjusted under 35 U.S.C. 154(b) by 913 days.

(21) Appl. No.: 16/327,610

(22) PCT Filed: Aug. 25, 2017

(86) PCT No.: PCT/US2017/048601
§ 371 (c)(1),
(2) Date: Feb. 22, 2019

(87) PCT Pub. No.: WO2018/039554
PCT Pub. Date: Mar. 1, 2018

(65) Prior Publication Data
US 2019/0186082 A1 Jun. 20, 2019

Related U.S. Application Data

(60) Provisional application No. 62/437,799, filed on Dec. 22, 2016, provisional application No. 62/379,496, filed on Aug. 25, 2016.

(51) Int. Cl.
*E01C 13/08* (2006.01)
*B32B 5/16* (2006.01)
(Continued)

(52) U.S. Cl.
CPC .............. *E01C 13/08* (2013.01); *B32B 5/16* (2013.01); *B32B 5/18* (2013.01); *B32B 5/22* (2013.01);
(Continued)

(58) Field of Classification Search
None
See application file for complete search history.

(56) References Cited

U.S. PATENT DOCUMENTS

| | | | |
|---|---|---|---|
| 3,481,257 A | 12/1969 | Shimp et al. | |
| 6,800,339 B2 * | 10/2004 | Motz | E01C 13/083 428/17 |

(Continued)

FOREIGN PATENT DOCUMENTS

| | | |
|---|---|---|
| WO | 9209265 | 6/1992 |
| WO | 2011024066 | 3/2011 |

OTHER PUBLICATIONS

European Patent Office, European Search Report and Search Opinion for EP 17844484, dated Feb. 6, 2020 (6 pgs.).

(Continued)

*Primary Examiner* — Alexandre F Ferre
(74) *Attorney, Agent, or Firm* — Wood Herron & Evans LLP

(57) ABSTRACT

An infilled artificial turf surface [18] includes a particulate infill [24] with at least a top layer [28] that comprises a mixture of Black walnut shell particles [30] and English walnut shell particles [32], the walnut shell particles [30, 32] having been treated so as to eliminate or substantially remove tree nut allergens that are known to activate allergies in some humans. Preferably, treatment occurs via heat treatment in a rotary furnace, which also rounds and smoothes the particles [30, 32]. Particularly if used in the top layer [28] of a particulate infill [24] of an artificial turf surface [18], the shape and size and proportion of the Black walnut shell particles [30] and the English walnut shell particles [32] provide stability for the resulting turf surface [18], while also being able to absorb water applied thereto, (Continued)

thereby to hold moisture and to provide evaporative cooling of the artificial turf surface [18] for up to about five hours.

8 Claims, 2 Drawing Sheets

(51) Int. Cl.
    *B32B 5/18*     (2006.01)
    *B32B 5/22*     (2006.01)
    *B32B 5/30*     (2006.01)
    *B32B 21/02*     (2006.01)
    *C08J 11/00*     (2006.01)
    *C08J 11/08*     (2006.01)

(52) U.S. Cl.
    CPC ............... *B32B 5/30* (2013.01); *B32B 21/02* (2013.01); *C08J 11/00* (2013.01); *C08J 11/08* (2013.01); *B32B 2255/04* (2013.01); *B32B 2264/06* (2013.01); *B32B 2264/10* (2013.01); *B32B 2264/12* (2013.01); *B32B 2307/402* (2013.01); *B32B 2307/4026* (2013.01); *B32B 2307/554* (2013.01); *B32B 2307/7145* (2013.01); *B32B 2307/7248* (2013.01); *C08J 2397/02* (2013.01)

(56) References Cited

U.S. PATENT DOCUMENTS

| | | | |
|---|---|---|---|
| 6,818,274 B1* | 11/2004 | Buck | A41G 1/009 |
| | | | 428/17 |
| 2009/0286017 A1* | 11/2009 | Horio | E01C 13/08 |
| | | | 428/17 |
| 2009/0324650 A1 | 12/2009 | Legon et al. | |
| 2010/0055461 A1 | 3/2010 | Daluise et al. | |
| 2015/0024087 A1 | 1/2015 | Brunet et al. | |
| 2018/0179711 A1* | 6/2018 | Wu | E01C 13/08 |

OTHER PUBLICATIONS

United States Patent and Trademark Office, Notice of Transmittal Of and International Search Report and Written Opinion for PCT/US2017/48601, dated Nov. 9, 2017 (10 pgs.).

* cited by examiner

TREATED WALNUT SHELL INFILL FOR ARTIFICIAL TURF

RELATED APPLICATIONS

This application claims priority to PCT/US2017/048601, filed on Aug. 25, 2017, which in turn claims priority to both U.S. Provisional Application Nos. 62/437,799, filed on Dec. 22, 2016, and 62/379,496, filed on Aug. 25, 2016, each of which. Each of these three applications is expressly incorporated by reference herein, in its entirety.

FIELD OF THE INVENTION

The present invention relates to infilled artificial turf, and more particularly, to an infilled artificial turf with an infill that includes a top layer comprising a preferred mixture of two types of treated walnut shell particles.

BACKGROUND OF THE INVENTION

In recent years, infilled artificial turf has become increasingly more popular and prevalent. Infilled artificial turfs provide a number of advantages over natural turf, including the capability for around the clock usage of the field, with reduced maintenance compared to the regular seeding, watering, and mowing that is required for a natural turf.

A typical infilled artificial turf includes a backing residing on a prepared and compacted base, the backing having a generally horizontally oriented primary and grass-like synthetic fibers extending generally upwardly from the primary, usually secured to the primary by tufting. A particulate infill resides on the top of the primary, and surrounds and supports the upright grass-like fibers. The particulate infill is usually placed on the primary with a spreader, and the surface is then brushed to help reorient the fibers to a generally upright orientation. This sequence of spreader applications, i.e., also sometimes called topdressings, followed by brushings, occurs until the desired infill height is achieved.

Many infilled artificial turfs have used a particulate that comprises a mixture of crumb rubber and sand. The sand supplies sufficient weight to the artificial turf component to help in stabilizing and holding down the primary. In some respects, the sand serves as a ballast layer. The crumb rubber provides resilience to the artificial turf surface. Crumb rubber is readily available and is typically obtained by shredding used vehicle tires. One example of this structure is shown in Prevost, U.S. Pat. No. 6,551,689, entitled "Synthetic Grass With Resilient Granular Top Surface Layer," which is incorporated by reference herein, in its entirety.

One problem with crumb rubber particles used in an artificial turf infill is that they substantially increase the temperature of the turf, because the black crumb rubber particles hold in heat. Another problem with crumb rubber particles is that they may present health and environmental concerns. In fact, certain jurisdictions in the United States, i.e., New York and California, have now ceased the further use of crumb rubber as an infill material for an infilled artificial turf.

These and other issues have caused a search for alternative infill materials for use with infilled artificial turfs. In an effort to minimize environmental and human health concerns, some of these efforts have focused on organic infill materials.

For example, U.S. Patent Publication No. 2010/0055461, entitled "Artificial Turf Infill" discloses an artificial turf infill comprising an organic material including ground walnut shells completely coated with a microbial agent so as to prevent decomposition. Applicant is not aware of any commercially available product that uses walnut shells in combination with the technology disclosed in this patent reference. PCT Application No. PCT/PH2007/000014, entitled "Infill Material For Artificial Turf System," discloses an infill mixture consisting of matured coconut shell, matured coconut husk, young coconut shell, young coconut husk, manila hemp, lignin, cassava. Each of these patent references is expressly incorporated by reference herein, in its entirety.

One infill product currently on the market, called Greenplay®, is described as an "organic coconut fiber and cork infill." Another infill product currently on the market is called Geofill™ and is sold by an entity called Italgreen S.P.A. This particular product has been described as "organic infill consisting of wood chips for use as ground cover and mulch consisting of coconut fiber." These two infills have at times been generically called "corkonut," and may actually be from the same source.

One common feature of all organic infills is that they have the ability to hold moisture after rainfall, or after watering, which thereby lowers the overall temperature of the artificial turf, via evaporative cooling. Thus, such infills can provide a lower temperature for the playing surface of the artificial turf, which thereby makes the turf more comfortable for athletes using the turf, and in some cases safer, compared to an infilled artificial turf which uses an infill that includes black crumb rubber.

However, it has been applicant's experience that existing organic infills, particularly those which primarily use coconut husks or fibers, have an optimum moisture range, such as 30-32%, wherein the product performs extremely well. However, at moisture ranges above or below the optimum range, the performance of the infill decreases significantly. In some cases, if the coconut material becomes too dry, it is even susceptible to blowing away or floating away.

As a result, a turf which uses this type of infill will almost certainly require an irrigation system, to achieve and maintain the optimum moisture range. Moreover, because of the susceptibilities described above, i.e., floating away or blowing away, a turf of this type will almost invariably require frequent supplementing of additional infill material. This can present an ongoing and a significant inconvenience and expense for the field owner, while also causing downtimes during which the field cannot be used.

Also, in general, such organic infills often are not heavy enough or dense enough to provide a ballast for the primary of the turf. One option for addressing this issue is to use a lower layer of sand, for ballast, and then to use an organic infill on top of the sand. However, with this structure the lower layer of sand is relatively hard. Thus, if the upper organic layer floats away or blows away, and is not immediately supplemented, the resulting turf surface can become very hard, due to the underlying sand, with substantially reduced capability for shock absorption upon impact.

The shock absorption capability of an artificial turf is typically measured by its G-Max rating. When an organic infill of this type of turf has degraded or deteriorated in this manner, as described above, even if only on some parts of the surface, the G-Max rating for portions of the surface can become dangerously and unacceptably high. This condition may endanger the health of the users of the turf, and is therefore not an acceptable situation for the field owner, particularly in view of the current awareness of the frequency of and implications of concussions from various sports.

Still further, it must be kept in mind that the playing surface of any infilled artificial turf should perform in a manner that, to the greatest extent possible, mimics the uniformity, stability, and consistency of a natural turf playing surface. Moreover, in identifying and producing an infill material that addresses these generally recognized concerns, it is important that the infill not be the source or origin of any new concerns or problems.

It is an object of this invention to identify a suitable infill material that will not only reduce the temperature of an artificial turf from the typically higher temperatures normally associated with an infilled artificial turf that includes crumb rubber in the infill, but will also perform in a manner that mimics the uniformity, stability, and consistency of a natural grass surface, without being limited to a relatively narrow moisture range.

It is another object of this invention to eliminate or to substantially reduce the environmental concerns that are currently associated with infilled artificial turfs which include crumb rubber in the infill, but to do so in a manner that does not render the substitute infill product more susceptible to floating away or blowing away.

It is still another object of the present invention to achieve an infilled artificial turf surface which uses an organic infill and better assures consistent and uniform conditions, particularly with respect to shock absorption and G-Max rating, but which does not necessarily require an irrigation system or regular supplements of infill.

It is still another object of the present invention to enhance the capability of current owners of artificial turf fields for immediately improving the playing conditions of an existing artificial turf, without having to completely replace the infill for the existing turf.

SUMMARY OF THE INVENTION

The present invention achieves these objects and others via an infilled artificial turf with an infill that includes a top layer comprising a mixture of treated Black walnut shell particles and treated English walnut shell particles, mixed in a proportion so as to provide overall stability for the artificial turf. The walnut shell particles are treated so as to eliminate or substantially reduce tree nut allergens, i.e. the proteins, that are known to activate nut allergies in some humans. Preferably, both types of walnut shell particles are generally of the same sieve size range, for reasons explained in more detail below.

According to one preferred embodiment of the invention, the walnut shell particles are immersed in a tank containing a buffering solution, preferably water with a 25 milli Molar solution of sodium bicarbonate. The particles are agitated for about ten minutes, and then permitted to dry. It is believed that this treating of the shell particles will remove ≥ 98% of the existing tree nut allergens, i.e. the proteins. Moreover, to the extent that this treating process may not remove all of the tree nut allergens in the walnut shell particles, it has been shown that any such remaining allergens are thereafter denatured naturally via normal freezing and thawing cycles of a typical moderate environment, and/or by the ultraviolet rays of the sun.

Moreover, the present invention further contemplates that the particles could be power washed and then rinsed, with the same buffering solution or perhaps a different buffering solution. To enhance the buffering effect the particles could be thereafter baked or otherwise heated. In addition, one or more additional substances could be added to the buffering solution to achieve a desired effect for the treated walnut shell particles, such as enhanced durability, improved rate of water evaporation, and/or resistance to rotting. For example, a green pigment could be added so as to provide a desired amount of green color for the particles.

Further, the walnut shell particles could be heat treated so as to achieve the desired goal of sufficiently eliminating tree nut allergens. Such heat treatment is preferably performed in a rotary furnace with feed, discharge, natural gas fired burner and air pollution control equipment. Applicant has identified an optimum set of heat treatment parameters which, in one test, reduced allergen levels to less than 1.0 ppm. The preferred parameters also provide additional advantages, namely, particles that are smooth and less abrasive, have reduced odor, less dust, a richer color, and a moisture content below 10%. If desired, as with the buffering treatment, with this type of heat treatment one or more additional substances could be added to achieve a desired effect.

As described above, organic infill materials such as coconut require a narrow moisture range to perform adequately. In contrast, lab tests show that walnut shell particles generally play the same, whether wet or dry. Thus, compared to existing infilled artificial turfs that include crumb rubber in the infill, applicant believes that an infilled artificial turf according to the present invention, with a top layer comprising a mixture of treated Black and English walnut shell particles, will be cooler and will remain cooler for a number of hours, after watering or after rain. Lab tests also show that walnut is cooler when dry than other current infill materials, particularly coconut infills. Thus, walnut shell particles serve as a suitable infill material in dry conditions. Also, when the treated walnut shell particles are wetted, the beneficial effects, i.e., cooler surface due to evaporative cooling, are achieved over a much greater moisture range. Stated alternatively, compared to other known organic infills, a walnut shell infill generally maintains the same hardness and the same temperature over a broader range of moisture ranges, including dry conditions, and thus is more versatile.

Moreover, compared to existing organic infills, applicant believes that the present invention provides an organic infill with greater durability, in that the preferred mixture of two types of walnut shell particles has less susceptibility to floating away or blowing away.

With the preferred infill of this invention, the actual surface itself has a high degree of uniformity, stability, and consistency, due in part to a "locked-in" effect provided by the two different shapes of walnut shell particles. More specifically, with a top layer that consists essentially of this mixture, the combination of rounder Black walnut shell particles and the less rounded (or angular) English walnut shell particles provides a high degree of stability for the entire surface. The infill particles do not "roll" excessively, nor do they stack or mound too high. As a result, the surface more closely mimics the uniformity and consistency of natural turf, compared to other particulate infills which do not have this "locked" feature.

The infill of the present invention resolves the current environmental concerns related to the use of crumb rubber as an infill material for an infilled artificial turf, while also more closely mimicking the uniformity, stability, and consistency of natural turf. Moreover, because the walnut shell particles are treated so as to remove tree allergens, the present invention does not serve as the source or origin of any new concerns or problems regarding infill materials.

According to another aspect of the invention, a preferred mixture of treated Black walnut shell particles and treated English walnut shell particles can be added to an in place, existing infilled artificial turf surface, to cover the crumb rubber or the sand/rubber mixture of particles residing therein. Then prior to use the artificial turf can be watered, for instance by using sprinklers. As a result, the top layer of treated walnut shell particles will absorb and retain some amount of the water, and thus reduce the overall temperature of the playing surface of the turf, thus making the artificial turf cooler during use for participants. This provides a viable way for current field owners to reduce the temperature of existing infilled artificial turf fields, without having to incur the expense of immediately replacing the infill or perhaps even the turf.

One preferred infill for an artificial turf, according to the present invention, includes a lower layer of sand particles residing on the primary, and then a top layer or upper layer consisting essentially of the above described preferred mix of treated walnut shell particles. This approach for implementing the invention is most suitable for newly installed infilled athletic turfs wherein the newly installed turf also has a pad located below the horizontally oriented primary of the artificial turf. Alternatively, the lower layer could comprise a sand/rubber mixture.

This present invention is suitable for athletic fields, and also for playgrounds or landscaping in homes and gardens.

Those skilled in the art will better understand and appreciate the features of the present invention by reviewing the accompanying drawings, which are briefly described immediately below. The same drawings are then described in more detail in the subsequent section of this specification.

BRIEF DESCRIPTION OF THE DRAWING(S)

DETAILED DESCRIPTION OF THE DRAWINGS

Because walnut shell particles comprise natural organic materials, the use of walnut shell particles as a top layer of an infilled artificial turf presents no new or unnatural health risk to athletes using the artificial turf, or to the surrounding environment, compared to infills which use crumb rubber. Also, compared to other organic infill materials, it is believed that walnut shell particles are generally cooler when dry, and that when they are wet the walnut shell particles have a more prolonged evaporative cooling effect. This means that a walnut shell infill is more versatile, because it performs reasonably well over a wider range of moisture conditions, from dry to completely wet.

Moreover, the preferred mixture of two types of walnut shell particles, according to the present invention, is believed to be more consistent, stable, and uniform than currently existing infill materials, and also more durable and longer lasting than other existing organic infills. As a result, it is also believed that the preferred mixture of walnut shell particles will result in an artificial turf surface that more closely mimics natural grass.

One reason for these beliefs is reflected by the teachings of the Reddick U.S. patents, particularly U.S. Pat. No. 7,858,148, which emphasizes the importance of infill particles that are relatively hard, and located within and among the grass-like fibers of an infill, such that any resilience for the turf is supplied below the horizontally oriented backing of the turf, by an underlying pad, preferably of foam.

Figure 1:
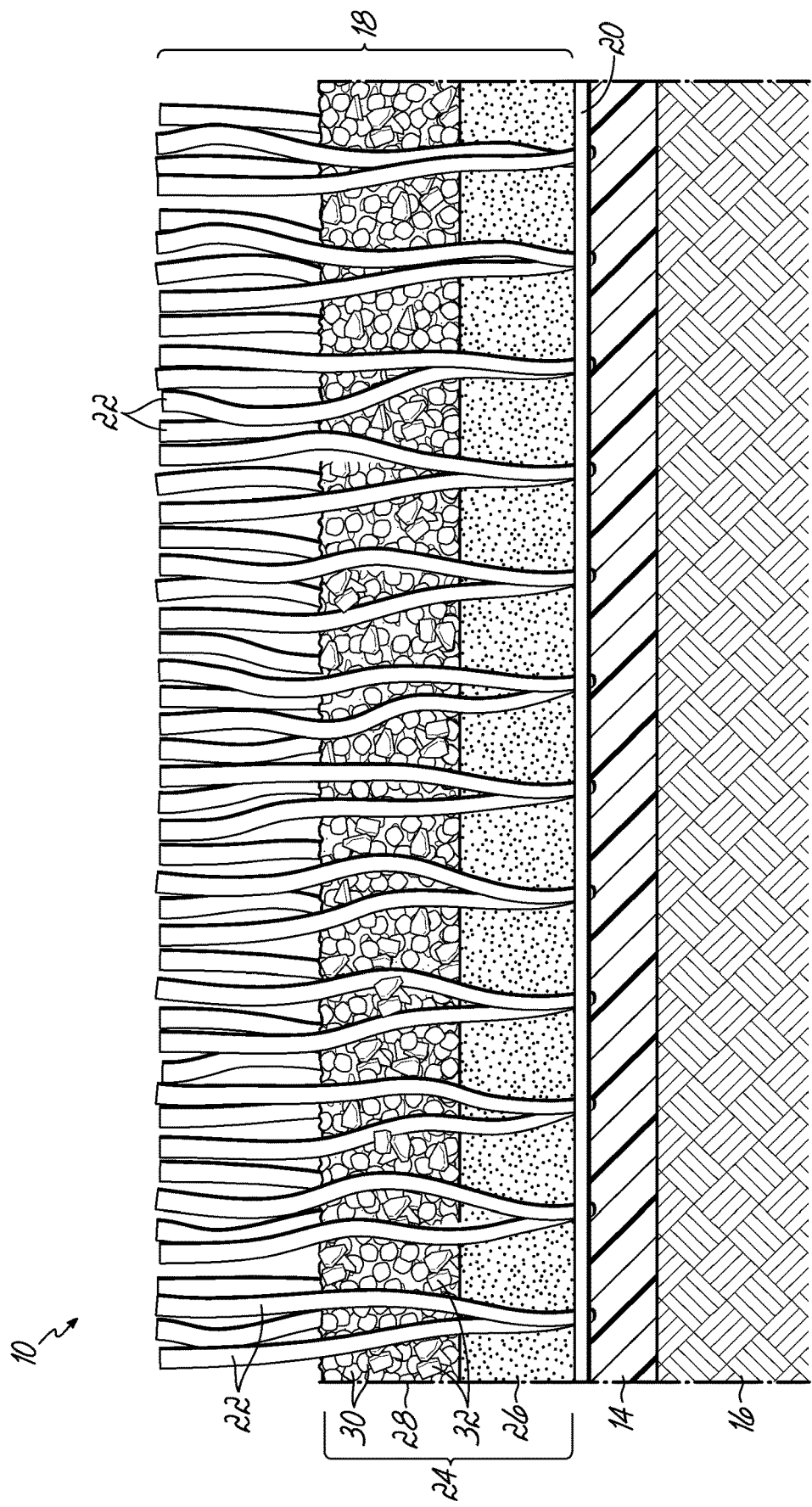
FIG. 1 is a cross sectional view of an infilled artificial turf according to a preferred embodiment of the invention, with a lower layer of sand infill and a top layer comprising a mixture of treated walnut shell particles, wherein the mixture preferably consists essentially of Black walnut shell particles and English walnut shell particles.

For example, FIG. 1 shows a cross sectional view of an exemplary artificial turf 10 according to a preferred embodiment of the present invention. More specifically, FIG. 1 shows a pad 14 which resides on a compacted base, or foundation 16. The base 16 is generally understood by those skilled in the art. The pad 14 may be of the type disclosed in U.S. Pat. No. 8,568,840. The actual components of what is commonly referred to as an artificial turf surface 18 reside above the pad 14, and include a horizontally oriented backing 20, often called a "primary," to which grass-like fibers 22 are secured, typically by tufting. The grass-like fibers 22 extend upwardly from the primary 20. A particulate infill 24 resides on the primary 20 amongst the grass-like fibers 22, the infill 24 supporting the fibers 22 in a generally upright condition. The infill 24 preferably includes a lower layer 26 of relatively heavy and dense particulate, such as sand, as shown in FIG. 1, or a sand/rubber mixture. The lower layer 26 provides weight and ballast which helps to hold down the artificial component. The infill also includes a top layer 28 of walnut shell particles, as shown in FIG. 1. The grass-like fibers 22 extend well above the top layer of the walnut shell particles.

Figure 3:
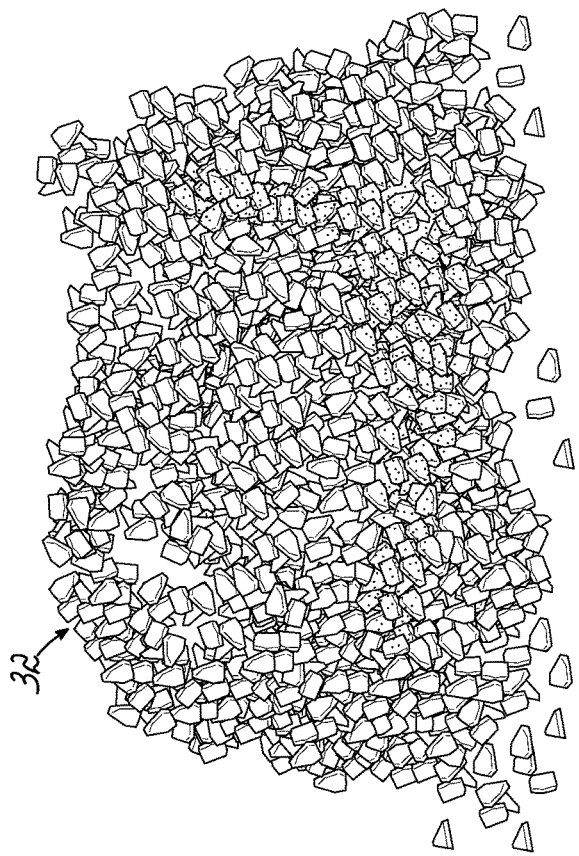
FIGS. 2 and 3 are, respectively, plan views of Black walnut shell particles of the type that are preferably used with the present invention, namely rounded particles with a sieve size of 8/12, and English walnut shell particles of the type that are preferably used with the present invention, namely angular particles with a sieve size of 8/12.
Figure 2:
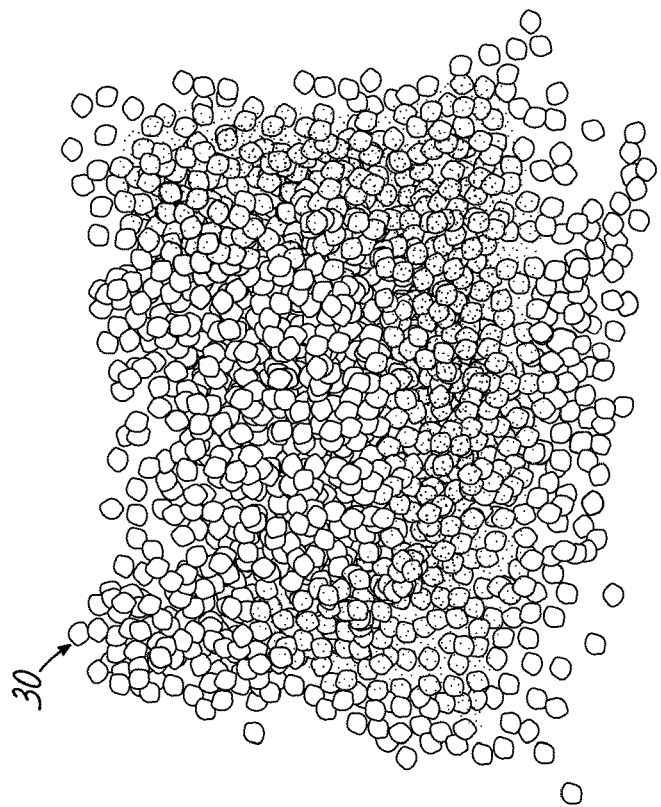

FIGS. 2 and 3 show the types of walnut shell particles included in the top layer. More specifically, FIG. 2 shows relatively round Black walnut shell particles, with a size range of 8/12 sieve. Thus, these particles are generally within a restricted size range. Similarly, FIG. 3 shows generally angularly shaped English walnut shell particles 32 which also have a size range of 8/12 sieve, and thus are also within a restricted size range. However, because of the inherent differences in the nature of English walnut particles 32 compared to Black walnut particles 30, the English walnut particles 32 are more angular.

When mixed, these two different types of walnut shell particles 30, 32 retain their relatively hard outer surface and texture, but they also tend to achieve a locked in relationship. In contrast to the infills taught in the above-cited U.S. Pat. No. 6,551,689 to Prevost, which teaches a resilient infill, due to the inclusion of rubber particles in the infill mixture, and in Meredith U.S. Pat. No. 5,041,320, which teaches rubber coated sand that is compressible, the infill according to the preferred embodiment shown in the FIG. 1 has two distinct layers 26, 28, and each of the two layers 26, 28 is neither resilient nor compressible. Rather, for each layer 26, 28, the discrete infill particles are relatively hard and non-compressible, and the layers of such particles are also non-resilient and non-compressible in the aggregate.

Because of the relatively uniform size of the walnut shell particles, this preferred mixture in the top layer 28 will not cause excessive "rolling," as would otherwise be caused by uniformly sized and shaped particles, such as ball bearings. But at the same time, these two distinct shapes will also resist mounding. Still further, it is believed that a top layer 28 of this preferred mixture will retain these above-described properties for a relatively long duration, at least compared to other currently available infills which include coconut or other organic particles. In fact, it is believed that the infill layer 28 of the present invention may even last up to at least about 8 years, the typical life span of the artificial turf surface 18. Thus, it is believed that an artificial turf surface 18 of the type shown in FIG. 1 will retain a relatively constant G-Max rating for an extended period of time, i.e., during the duration of its useful life. Applicant is currently aware of only one other infill product, its own ENVIRO-FILL product, which enables an infilled artificial turf surface to achieve this goal.

The types of walnut shell particles 30, 32 used with this invention will naturally include tree allergens, i.e., proteins, which may cause an allergic reaction in a human who suffers from nut allergies. And the conventional processing of walnuts, to separate the shell particles from the walnut "meat," will generally result in shell particles that have some residual walnut meat thereon. To eliminate potential concerns associated with this condition, the walnut shell particles 30, 32 are treated prior to use. Preferably, the two types of walnut shell particles 30, 32 are mixed together and then treated as a mixture. As noted above, any one of a number of treatment procedures may be used.

Preferably, the walnut shell particles 30, 32 are sized and sieved before the treatment procedure, to achieve the desired size range, which may be the same as those shown in FIGS. 2 and 3. The mixture ratio, by volume, contemplates a range of 25-75% English walnut shell particles 32 and 75-25% Black walnut shell particles 30, although a 50/50 mixture, by volume, is currently believed to be the optimum mixture.

One effective treatment method includes immersing the walnut shell particles 30, 32, separately or mixed, in a buffering solution comprising water and an effective amount of sodium bicarbonate, which preferably may be about 25 milli Moles.

Another effective treatment method comprises heat treatment of the particles 30, 32 in a rotary furnace, during which the heating/tumbling provides a number of additional benefits, besides the removal of allergens. More specifically, the use of a rotary furnace results in rounding of the particles, i.e. the smoothing of the otherwise sharp edges. This process also reduces the odor of the particles, from a strong, loamy aroma to a mild, roasted aroma. Further, this process removes dust (compared to the raw material), produces a richer color that looks more like natural dirt, and also produces a moisture content below 10%, a level that will not propagate mold during storage. Applicant tested various temperature/time parameters, as shown in a report by Vulcan Systems, a Division of Worldwide Recycling Equipment Sales, LLC, entitled "Final Test Report: 16PS0205." This report describes the use of various heat and time parameters for the heating and tumbling, and it is expressly incorporated by reference herein, in its entirety.

As a result of these test efforts, applicant currently believes that the best results are achieved by heating the particles 30, 32 in a rotary furnace set with a temperature in the range of 360-400° F., but more preferably at 390° F., for a duration of 30 minutes. The goal with the test was to achieve an allergen level of less than 10 ppm. With the preferred parameters of 390° F. and 30 minutes, applicant achieved a result of 0.27 ppm. Other sources of heat and/or agitation could also prove to be suitable, such as a fluidized bed dryer.

Those skilled in the art will understand and appreciate that this specification is intended to explain the details of the present invention in the context of the exemplary embodiments disclosed herein. Those same persons of skill in the art will also understand that this specification is not intended to limit the scope of the present invention to the presently disclosed details, or to be used to limit the scope of the following claims. Further, those skilled in the art will recognize that the recitation of "objects" of the invention in this specification is intended to describe the inventor's current understanding of the deficiencies of the known prior art, so as to inform and enhance the reader's overall understanding of this specification, not to serve as a requirement for each of the following claims. In other words, those skilled in the art should recognize that applicant does not intend that each of the appended claims will achieve every one of the above-stated objectives.

I claim:

1. An artificial turf comprising:
   a base;
   a backing located above the base, the backing having a primary and grass-like fibers extending upwardly therefrom;
   a particulate infill residing on the primary and providing lateral support for the grass-like fibers; and
   the particulate infill including a lower layer consisting essentially of sand and a top layer of treated walnut shell particles, the treated walnut shell particles having been treated so as to substantially eliminate tree nut allern ens therefrom wherein the top layer further comprises:
   a mixture of treated English walnut shell particles and treated Black walnut shell particles.

2. The artificial turf of claim 1 wherein the mixture comprises about 25-75% English walnut shell particles and about 75-25% Black walnut shell particles, by volume.

3. The artificial turf of claim 2 wherein the top layer consists essentially of the mixture of treated English walnut shell particles and treated Black walnut shell particles.

4. The artificial turf of claim 3 wherein at least some of the treated walnut shell particles are at least partially coated with a green pigment.

5. The artificial turf of claim 3 wherein the treated English walnut shell particles have a sieve size of 6-30 and the treated Black walnut shell particles have a sieve size of 6-30.

6. An artificial turf comprising:
   a base;
   a backing located above the base, the backing having a primary and grass-like fibers extending upwardly therefrom;
   a particulate infill residing on the primary and providing lateral support for the grass-like fibers; and
   the particulate infill including a lower layer consisting essentially of sand and a top layer of treated walnut shell particles, the treated walnut shell particles having been treated so as to substantially eliminate tree nut allergens therefrom wherein the top layer consists essentially of treated walnut shell particles.

7. An artificial turf comprising:
   a base;
   a backing located above the base, the backing having a primary and grass-like fibers extending upwardly therefrom;
   a particulate infill residing on the primary and providing lateral support for the grass-like fibers, the particulate infill including a lower layer consisting essentially of sand, and a top layer of treated walnut shell particles residing above the lower layer, the treated walnut shell particles having been treated so as to substantially eliminate tree nut allergens therefrom, wherein the top layer consists essentially of a mixture of treated English walnut shell particles and treated Black walnut shell particles.

8. The artificial turf of claim 7 wherein the mixture comprises about 25-75% English walnut shell particles and about 75-25% Black walnut shell particles.

* * * * *